United States Patent [19]

Ware

[11] 4,332,363
[45] Jun. 1, 1982

[54] ADJUSTABLE LIGHT HANGER

[76] Inventor: Don E. Ware, 4963 E. 26th Pl., Tulsa, Okla. 74114

[21] Appl. No.: 118,542

[22] Filed: Feb. 4, 1980

[51] Int. Cl.³ .............................. F16L 3/12; F21S 1/02
[52] U.S. Cl. .................................... 248/321; 248/327; 248/336; 362/418; 403/108
[58] Field of Search ............... 248/320, 321, 327, 336, 248/337, 333, 407, 409, 423; 362/418; 403/108, 322

[56] References Cited

U.S. PATENT DOCUMENTS

| 146,104 | 12/1873 | Staehlen | 248/336 |
| 285,963 | 10/1883 | Brannen | 248/337 |
| 724,615 | 4/1903 | Rockwell et al. | 248/337 |
| 971,899 | 10/1910 | Kennedy | 248/336 |
| 3,831,894 | 8/1974 | Newton et al. | 248/327 |

FOREIGN PATENT DOCUMENTS

| 711308 | 9/1941 | Fed. Rep. of Germany | 362/418 |
| 6321 | of 1903 | United Kingdom | 248/336 |
| 479192 | 2/1938 | United Kingdom | 248/321 |

Primary Examiner—James Kee Chi
Attorney, Agent, or Firm—Head & Johnson

[57] ABSTRACT

An adjustable support device for appliances being comprised of a housing with top and bottom aligned openings therethrough and which is attached to a support member by a clamp mechanism. An elongated support member or tubing which is provided with a plurality of aligned openings one side thereof passing through the opening of the housing and is in contact within the housing with a pair of upper opposed rollers and a lower roller being in contact with only one side of the member. A locking mechanism is pivotally mounted within the housing and is co-operable with the openings in the elongated support member and is provided with a guide device, such as a roller, which extends outward therefrom and is in contact with the support member. The lower opening in the housing is elongated towards the locking mechanism whereby when the support is in the aligned vertical position upward vertical movement is allowed and downward vertical movement is prevented and when the elongated support member is canted from the vertical position towards the locking mechanism, the guide mechanism displaces the locking mechanism to allow both upward and downward vertical movement of the elongated support member.

6 Claims, 5 Drawing Figures

ADJUSTABLE LIGHT HANGER

BACKGROUND OF THE INVENTION

1. Field of the Invention

The present invention relates to a vertically adjustable appliance support mechanism and more particularly, to such a mechanism with positive locking for support of appliances such as lights or other studio equipment.

2. Description of the Prior Art

There are a great number of appliance support mechanisms in use today, however, a majority of these mechanisms cannot be operated with one hand. The U.S. Pat. No. 3,831,894 to Newton, II et al discloses a mechanism to provide one-handed vertical movement of an appliance support. The patent to Newton does not however, provide positive locking of the vertical support to ensure that the support will not slip under the weight of numerous lights. The internal workings of the Newton mechanism allows for the possibility of the vertical support becoming jammed within the mechanism. There does not appear to be any devices on the market which provide positive locking, as well as, being non-jammable.

SUMMARY OF THE INVENTION

The present invention provides an adjustable support mechanism for studio lights or other similar appliances which is simple to operate and provides smooth upward and downward movement of the support member. The present invention provides for positive engagement for a lock to the support member to prevent downward vertical movement of the member and is so constructed so as to prevent the possibility of jamming of the lock mechanism.

The adjustable support mechanism is comprised of a housing which is provided with a top and bottom openings therethrough and is removably attached to a support member by a clamp mechanism. An elongated support member or tubing passes through the opening of the housing and has a plurality of openings therein on a first side thereof. A pair of opposed double-flanged rollers are mounted within the housing adjacent the top opening therein and one of the rollers is in contact with a first side of the member and the second of the rollers is in contact with a second side of the member. A lower roller is mounted within the housing adjacent the bottom opening and in contact with the second side of the member. A pivotal locking mechanism is mounted within the housing and is co-operable with the openings in the member and is provided with a guide mechanism, such as a roller, which is in contact with the first side of the member. The bottom opening within the housing is elongated towards the locking mechanism so that when the member is in the aligned vertical position, upward vertical movement is permitted and downward vertical movement is prevented. When the member is canted towards the locking mechanism, the guide roller displaces the locking mechanism so as to allow both upward and downward vertical movement of the member. The locking mechanism is provided with a bevel-edged pin or blade which is co-operable with the openings within the member. The member may be round or square tubing and has electrical cables running therethrough to lights or other similar studio appliances which are attached at a lower portion of the tubing.

DETAILED DESCRIPTION OF THE PREFERRED EMBODIMENTS

Figure 1:
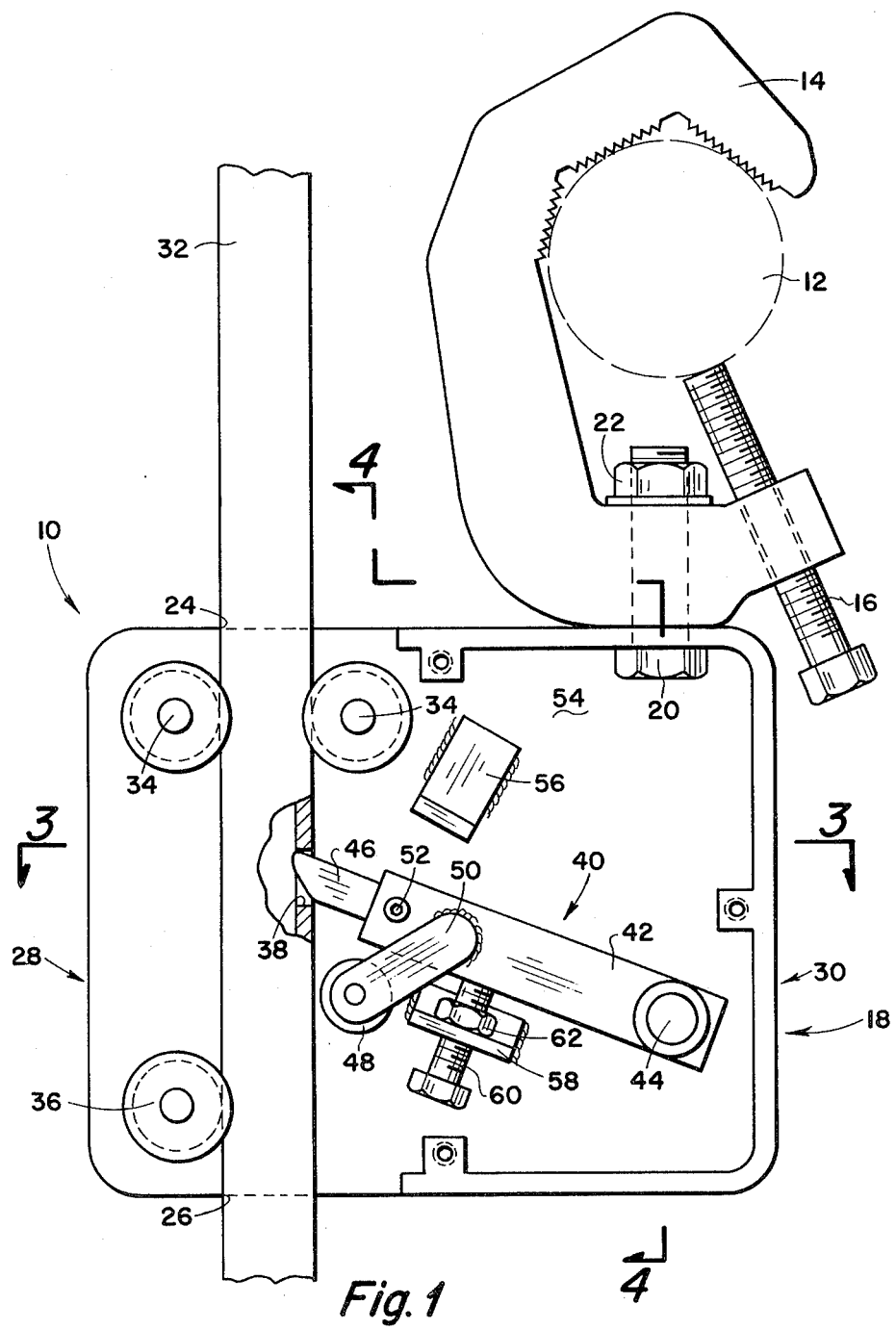
FIG. 1 is a side elevational view of an adjustable light hanger apparatus embodying the present invention, with a vertical support positively engaged therein.
Figure 4:
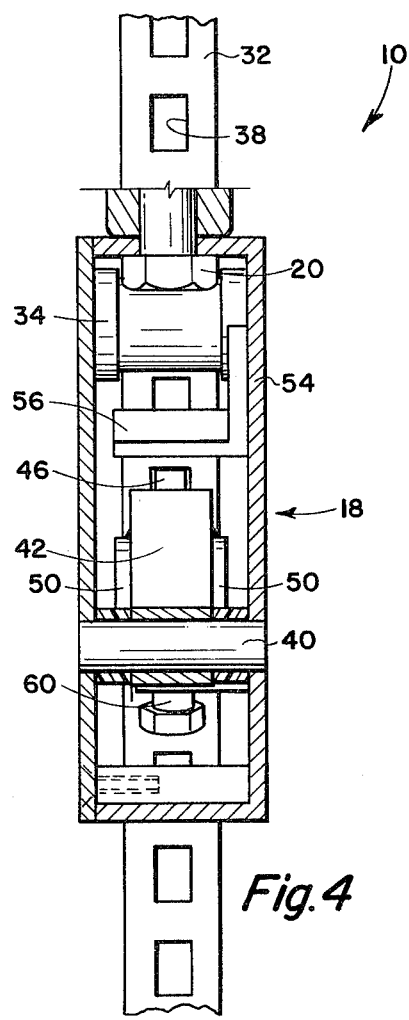
FIG. 4 is a view taken along line 4—4 of FIG. 1.

Reference character 10 generally indicates an adjustable support mechanism for appliances, such as, light or other television studio equipment. As shown in FIGS. 1 & 4, the mechanism 10 is connected to a horizontal support bar or beam 12 within the television studio by means of a "c" clamp 14. The clamp 14 is secured to the bar 12 by means of an elongated threaded bolt 16 which is threaded through the lower portion of the clamp 14 and into contact with the bar 12. The clamp 14 is in turn connected to a rectangular housing 18 by means of a bolt 20 and a nut 22 threaded thereon. The rectangular housing 18 is provided with a top opening 24 and a bottom opening 26 adjacent a first side 28 thereof. The top and bottom openings 24 and 26 are in alignment and the bottom opening 26 is elongated towards a second side 30 of the housing 18. An elongated support 32 constructed of square or round hollow tubing extends through the openings 24 and 26 in the housing 18 and has studio lights (not shown) or other similar appliances attached to the lower portion thereof. Electrical supply cables (not shown) extend through the interior of the member 32 and provide electrical power to the lights and appliances.

Figure 3:
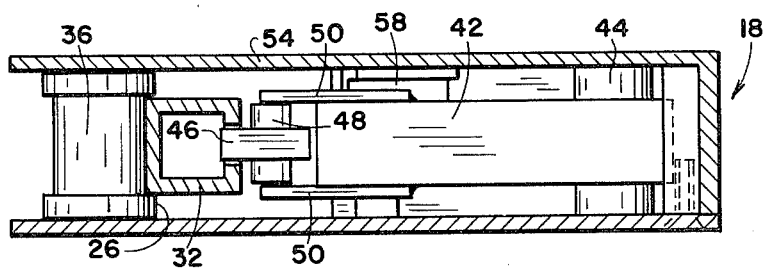
FIG. 3 is taken along line 3—3 of FIG. 1.

A pair of double-flanged rollers 34 are mounted within the upper portion of the housing 18 and are opposed on either side of the opening 24. As shown in FIG. 3, a second double-flanged roller 36 is mounted within the lower portion of the housing 18 adjacent the opening 26 and adjacent the first side 28 of the housing 18. The member 32 is provided with a plurality of aligned openings 38 and is inserted into the housing 18 in contact with the rollers 34 and 36 so that the openings 38 face towards the second side 30 of the housing 18.

A pivotal locking means 40 is co-operable with the openings 38 in the member 32 and is comprised of a rectangular member 42 which is pivotally mounted within the housing 18 by means of a pin 44 extending therethrough, a bevel-edged bar 46 which is inserted into the openings 38, and a roller 48 which is mounted between parallel lugs 50 which extend from the edges of the member 42. The bar 46 may be adjusted inwardly or outwardly for engagement with different sized openings 38 by means of a screw 52 which secures the bar 46 within the member 42. The housing 18 is provided with a removable front plate (not shown) and a back plate 54. An "L" shaped brace 56 is mounted within the housing 18 to the back plate 54 and acts as an upper stop to the locking means 40. A lower "L" shaped brace 58 is attached to the plate 56 and acts as a lower stop to the locking means 40. The positioning of the locking means 40 at rest may be adjusted for optimal engagement with the support member 32 by means of a threaded bolt 60 extending through the brace 58 with a nut 62 threaded thereto and which is in contact with the member 42.

Figure 2:
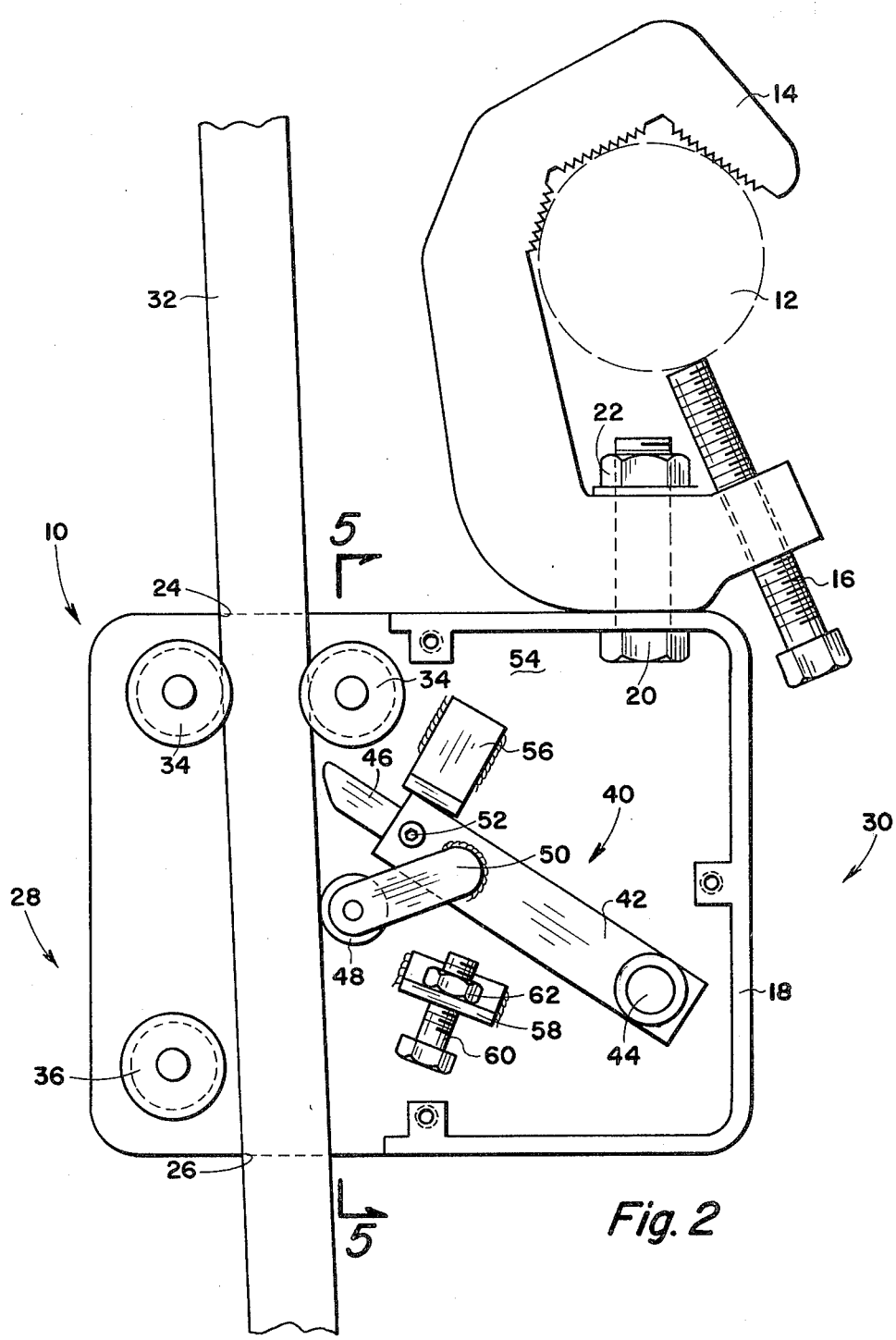
FIG. 2 is a side elevational view of the present invention showing the vertical support in position for either upward or downward vertical movement.
Figure 5:
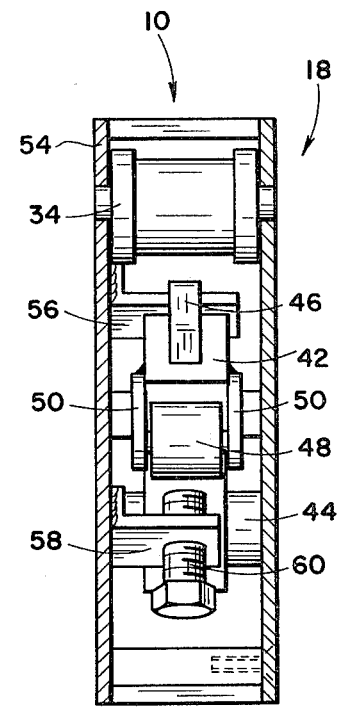
FIG. 5 is a view taken along line 5—5 of FIG. 2.

When the member 32 with the lights attached to the end thereof are to be raised, the member 32 is merely pushed upwards through the mechanism 10 and, as can be seen, the bevel-edged blade 46 is pushed upwards by the openings 38 in the member 32 and allows upward movement of the member 32. Downward movement of the member 32 is prevented by means of a flat upper edge of the blade 46 as well as the lower stop 58 preventing the downward movement of the locking means 40. When the support member 32 is to be lowered, the member 32 is canted or pushed towards the second side 30 of the mechanism 10 as shown in FIGS. 2 and 5 whereby the member 32 comes into contact with the roller 48 which forces the blade 46 upwards and outwards from engagement with the openings 38. When the member 32 is canted, the locking means 40 permits both upward and downward movement. The upper stop 56 prevents the locking mechanism 40 from being pivoted upward into an inoperative position.

Whereas the present invention has been described in particular relation to the drawings attached hereto, it should be understood that other and further modifications of the invention, apart from those shown or suggested herein, may be made within the scope and spirit of this invention.

What is claimed is:

1. An adjustable support device for appliances comprising a housing having a first and second side and with top and bottom aligned openings therethrough, said housing having clamp means for removable attachment to a support member; an elongated support means having a first and second side passing through said openings in said housing, said elongated support means having a plurality of aligned openings therein on a first side thereof; a plurality of opposed rollers mounted within said housing adjacent said top openings therein, one of said rollers being in contact with said first side of said elongated support means and a second of said rollers being in contact with said second side of said elongated support means; a lower roller mounted within said housing below said second of said rollers and adjacent said bottom opening therein and being in contact with said second side of said elongated support means; locking means pivotally mounted within said housing and co-operable with said openings in said elongated support means, said locking means having a guide means extending therefrom and in contact with said first side of said support means whereby when said elongated support means is in the aligned vertical position said locking means permits upward vertical movement and prevents downward vertical movement and when said elongated support means being canted from the vertical position towards said locking means, said guide means displaces said locking means to allow upward and downward vertical movement.

2. An adjustable support means as in claim 1 wherein said guide means being a roller.

3. An adjustable support means as in claim 1 wherein said locking means having a bevel-edged blade means co-operable with said openings in said elongated support means.

4. An adjustable support means as in claim 1 wherein said elongated support means being square tubing.

5. An adjustable support means as in claim 1 wherein light fixtures and other appliances being mounted to said elongated support means.

6. An adjustable support means as in claim 1 wherein said rollers being double flanged.

* * * * *